(12) United States Patent
Onggosanusi et al.

(10) Patent No.: US 11,025,385 B2
(45) Date of Patent: *Jun. 1, 2021

(54) METHOD AND APPARATUS FOR CHANNEL STATE INFORMATION REFERENCE SIGNAL (CSI-RS)

(71) Applicant: Samsung Electronics Co., Ltd., Suwon-si (KR)

(72) Inventors: Eko Onggosanusi, Coppell, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,409

(22) Filed: Nov. 14, 2019

(65) Prior Publication Data

US 2020/0084001 A1    Mar. 12, 2020

Related U.S. Application Data

(63) Continuation of application No. 15/888,838, filed on Feb. 5, 2018, now Pat. No. 10,498,507.

(Continued)

(51) Int. Cl.
*H04W 72/04* (2009.01)
*H04L 5/00* (2006.01)
(Continued)

(52) U.S. Cl.
CPC ............ *H04L 5/0048* (2013.01); *H04L 5/005* (2013.01); *H04L 5/0053* (2013.01);
(Continued)

(58) Field of Classification Search
CPC .... H04W 24/10; H04W 72/042; H04L 5/004; H04L 5/0048; H04L 5/005; H04L 5/0053; H04L 5/0057

See application file for complete search history.

(56) References Cited

U.S. PATENT DOCUMENTS 9,572,063 B2 * 2/2017 Etemad .................. H04B 17/27
9,794,913 B2 * 10/2017 Lee ........................ H04W 72/04
(Continued)

FOREIGN PATENT DOCUMENTS

EP          2852072 A1      3/2015
KR     20170020270 A       2/2017

OTHER PUBLICATIONS

Supplementary European Search Report in connection with European Application No. 18770404.4 dated May 4, 2020, 12 pages.

(Continued)

*Primary Examiner* — Wei Zhao

(57) ABSTRACT

Channel state information reference signal (CSI-RS) reporting includes receiving and decoding higher-layer configuration information for N CSI reporting settings and M Resource settings. A downlink control information (DCI) that includes a DCI field for requesting aperiodic CSI reporting is received. A CSI is calculated according to the configuration information and the DCI and transmitting the calculated CSI on an uplink (UL) channel. N is at least one, M is at least one, and the DCI field includes a selection of one out of $X_{STATE}$ configured states.

20 Claims, 9 Drawing Sheets

Related U.S. Application Data

(60) Provisional application No. 62/474,398, filed on Mar. 21, 2017, provisional application No. 62/489,832, filed on Apr. 25, 2017, provisional application No. 62/583,887, filed on Nov. 9, 2017, provisional application No. 62/611,350, filed on Dec. 28, 2017, provisional application No. 62/616,371, filed on Jan. 11, 2018, provisional application No. 62/620,732, filed on Jan. 23, 2018.

(51) Int. Cl.
*H04W 24/10* (2009.01)
*H04W 88/08* (2009.01)
*H04W 88/02* (2009.01)

(52) U.S. Cl.
CPC .......... *H04L 5/0057* (2013.01); *H04W 24/10* (2013.01); *H04W 72/042* (2013.01); *H04W 88/02* (2013.01); *H04W 88/08* (2013.01)

(56) References Cited

U.S. PATENT DOCUMENTS

| | | | |
|---|---|---|---|
| 2015/0208392 A1* | 7/2015 | Park | H04B 7/024 370/329 |
| 2018/0241523 A1 | 8/2018 | Noh et al. | |
| 2020/0112407 A1* | 4/2020 | Yum et al. | H04B 17/336 |

OTHER PUBLICATIONS

Huawei, et al., "Considerations on two-level configuration of CSI acquisition settings," R1-1701682, 3GPP TSG RAN WG1 Meeting #88, Athens, Greece, Feb. 13-17, 2017, 5 pages.

European Patent Office Communication pursuant to Article 94(3) EPC, dated Jan. 28, 2021 regarding Application No. 18770404.4, 8 pages.

* cited by examiner

METHOD AND APPARATUS FOR CHANNEL STATE INFORMATION REFERENCE SIGNAL (CSI-RS)

CROSS-REFERENCE TO RELATED APPLICATIONS AND CLAIM OF PRIORITY

This application is a continuation of U.S. Non-Provisional patent application Ser. No. 15/888,838 filed Feb. 5, 2018, now U.S. Pat. No. 10,498,507 issued Dec. 3, 2019, and claims priority to U.S. Provisional Patent Application No. 62/474,398 filed Mar. 21, 2017; U.S. Provisional Patent Application No. 62/489,832 filed Apr. 25, 2017; U.S. Provisional Patent Application No. 62/583,887 filed Nov. 9, 2017; U.S. Provisional Patent Application No. 62/611,350 filed Dec. 28, 2017; U.S. Provisional Patent Application No. 62/616,371 filed Jan. 11, 2018; and U.S. Provisional Patent Application No. 62/620,732 filed Jan. 23, 2018. The above-identified patent documents are hereby incorporated by reference.

TECHNICAL FIELD

The present disclosure relates generally to methods for enabling Channel State Information Reference Signal (CSI-RS) resource allocation. Such methods can be used when a user equipment is equipped with a plurality of transmit antennas and transmit-receive units.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CSI-RS resource allocation.

In one embodiment, a user equipment (UE) is provided. The UE includes a transceiver and a processor operably connected to the transceiver. The transceiver is configured to receive higher-layer configuration information for N channel state information (CSI) reporting settings and M Resource settings and receive downlink control information (DCI) that includes a DCI field for requesting aperiodic CSI reporting. The processor is configured to decode the configuration information and the DCI and calculate a CSI according to the configuration information and the DCI. The transceiver is further configured to transmit the calculated CSI on an uplink (UL) channel. N is at least one, M is greater than one, and the DCI field includes indicates a selection of one out of $X_{STATE}$ configured states.

In another embodiment, a base station (BS) is provided. The BS includes a processor and a transceiver operably connected to the processor. The processor is configured to generate (i) higher-layer configuration information for N CSI reporting settings and M Resource settings, and (ii) DCI that includes a DCI field for requesting aperiodic CSI reporting. The transceiver is configured to transmit, to a UE, the configuration information and the DCI to the UE via a one or more downlink (DL) control channels and receive, from the UE, a CSI report calculated in accordance with the configuration information and the DCI on an UL channel. N is at least one, M is greater than one, and the DCI field includes a selection of one out of $X_{STATE}$ configured states.

In another embodiment, a method for operating a UE is provided. The method includes receiving and decoding higher-layer configuration information for N CSI reporting settings and M Resource settings. The method also includes receiving DCI that includes a DCI field for requesting aperiodic CSI reporting. The method further includes calculating a CSI according to the configuration information and the DCI and transmitting the calculated CSI on an uplink (UL) channel. N is at least one, M is greater than one, and the DCI field includes a selection of one out of $X_{STATE}$ configured states.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
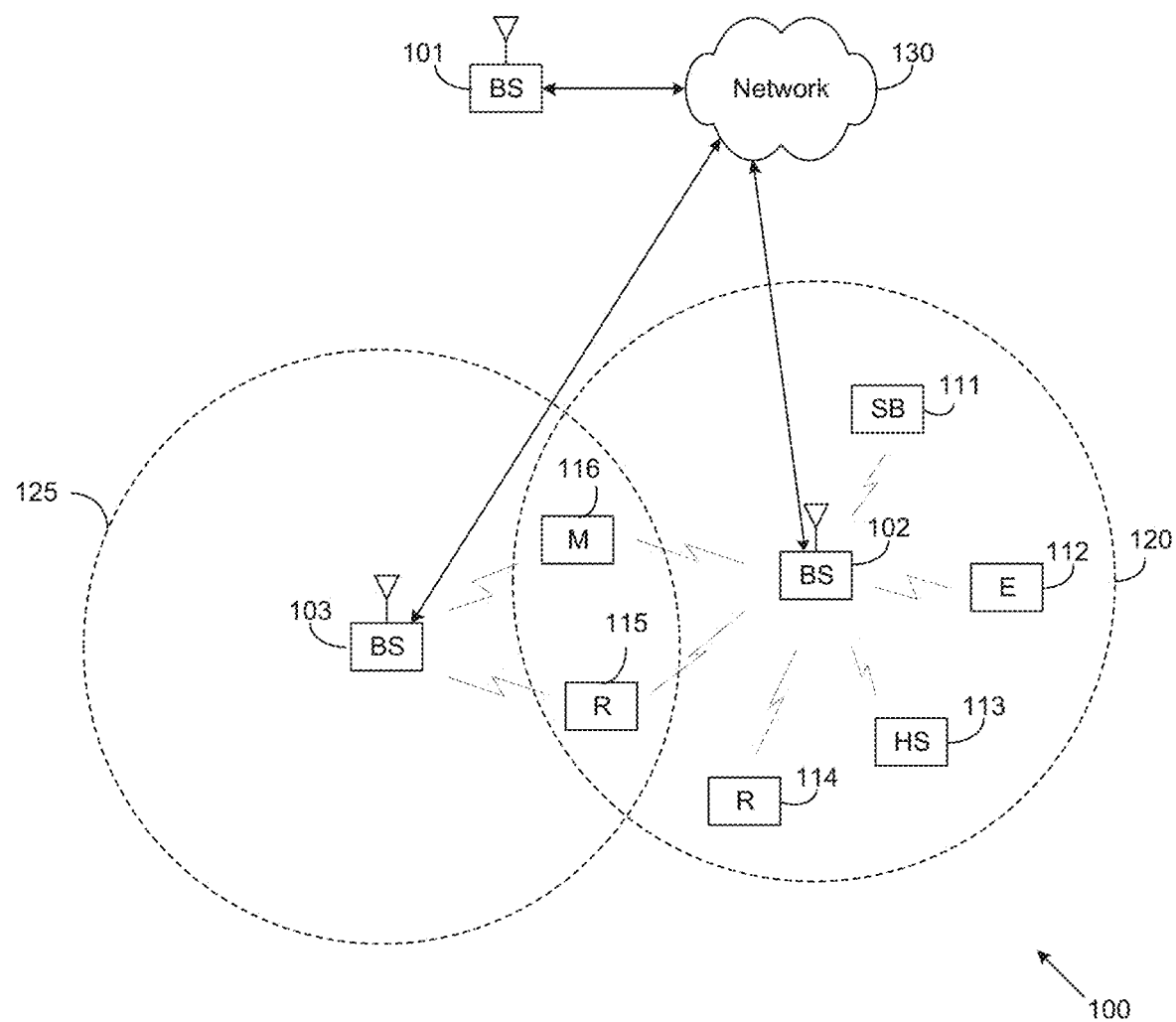
FIG. 1 illustrates an example wireless network according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); and 3GPP TS 38.331 version 15.0.0, "NR, Radio Resource Control (RRC) Protocol Specification" ("REF 11").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for CSI reporting as described in embodiments of the present disclosure. In various embodiments, one or more of UEs 111-116 receive Channel State Information Reference Signal (CSI-RS).

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
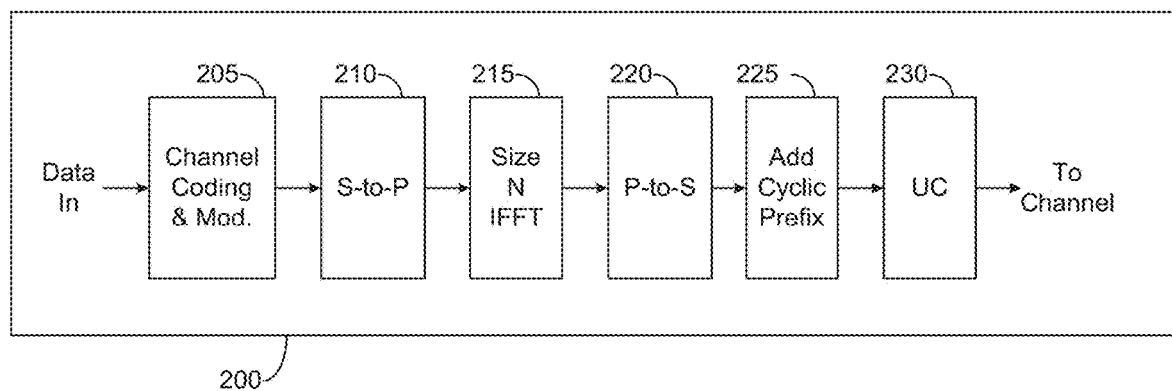
FIGS. 2A and 2B illustrate example wireless transmit and receive paths according to various embodiments of the present disclosure.
Figure 2B:
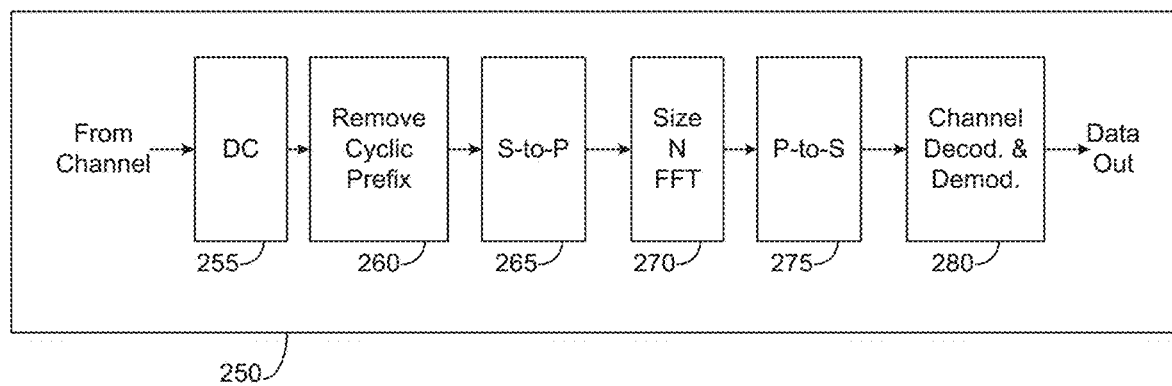

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to receive CSI-RS as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
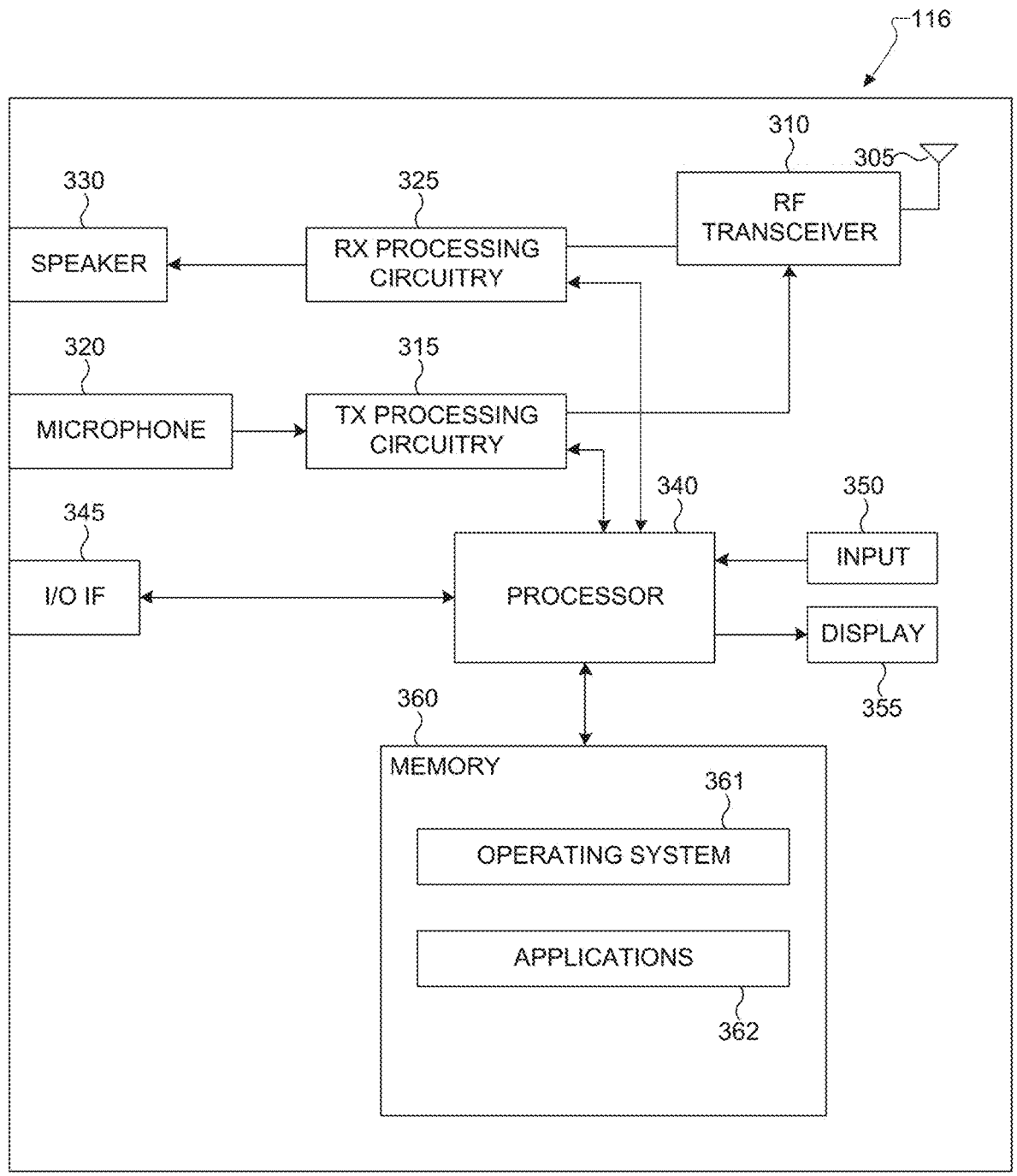
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CSI-RS reception and measurement for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
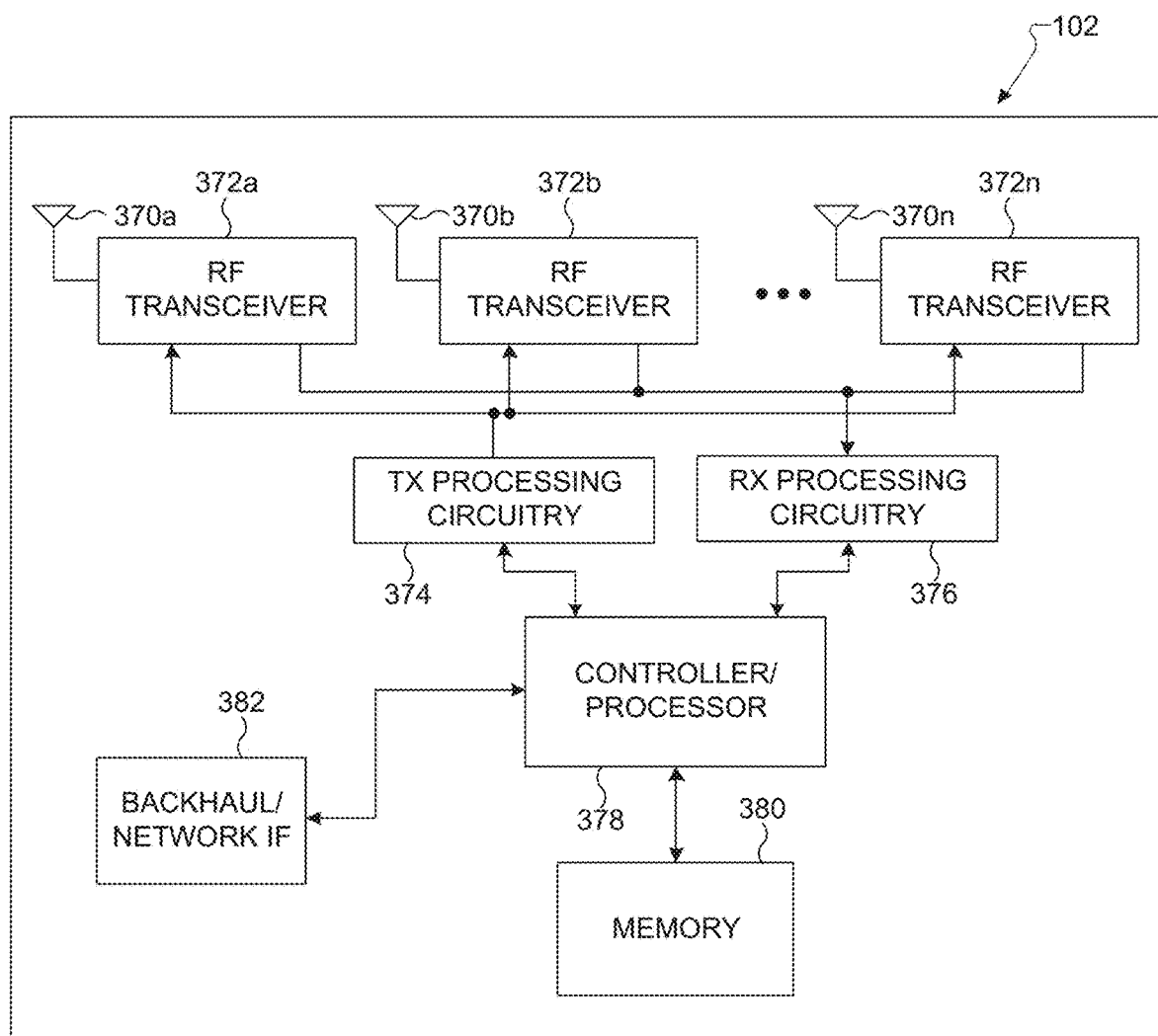
FIG. 3B illustrates an example base station (BS) according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 could support communications over any suitable wired or wireless connection(s). For example, when the gNB 102 is implemented as part of a cellular communication system (such as one supporting 5G or new radio access technology or NR, LTE, or LTE-A), the backhaul or network interface 382 could allow the gNB 102 to communicate with other gNBs over a wired or wireless backhaul connection. When the gNB 102 is implemented as an access point, the backhaul or network interface 382 could allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) allocate and transmit CSI-RS.

Although FIG. 3B illustrates one example of a gNB 102, various changes can be made to FIG. 3B. For example, the gNB 102 could include any number of each component shown in FIG. 3A. As a particular example, an access point could include a number of backhaul or network interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
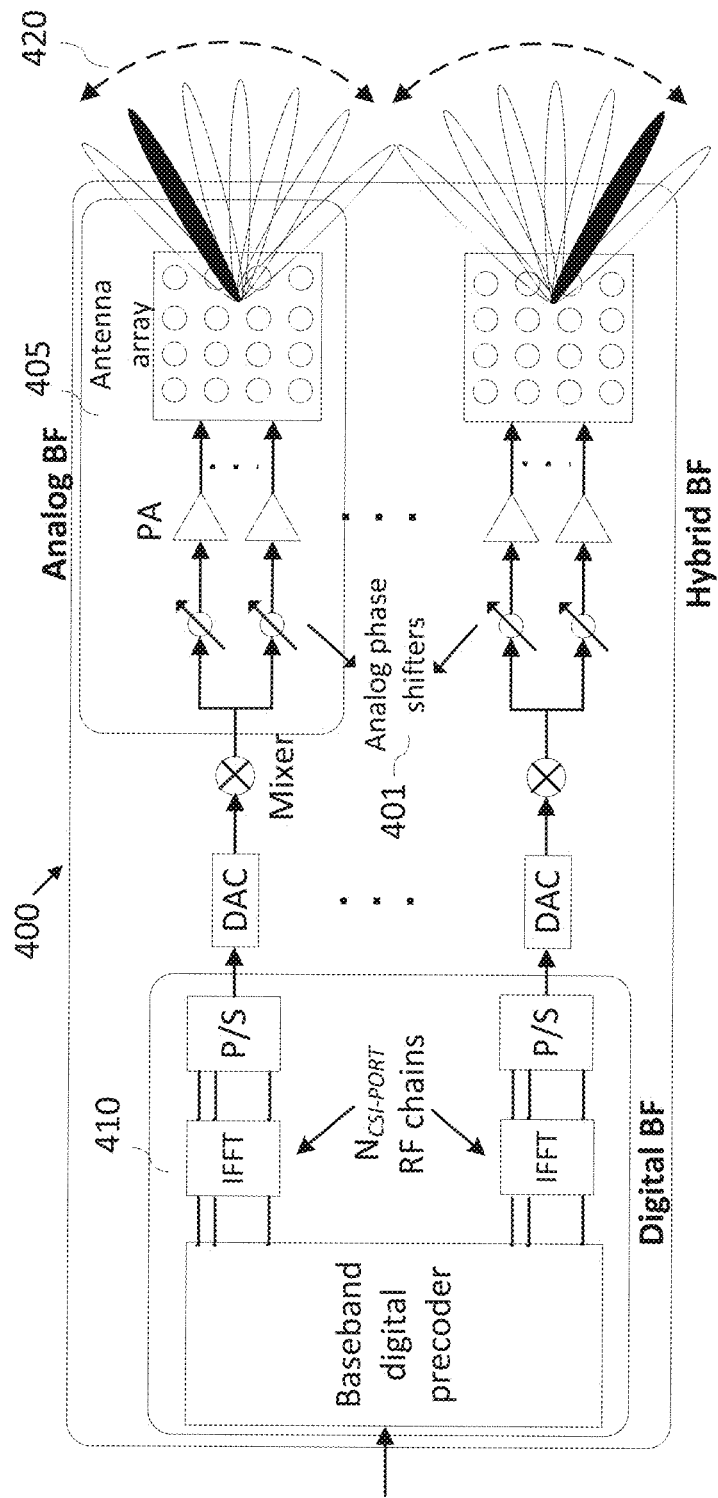
FIG. 4 illustrates an example beamforming architecture wherein one CSI-RS port is mapped onto a large number of analog-controlled antenna elements.
Figure 5:
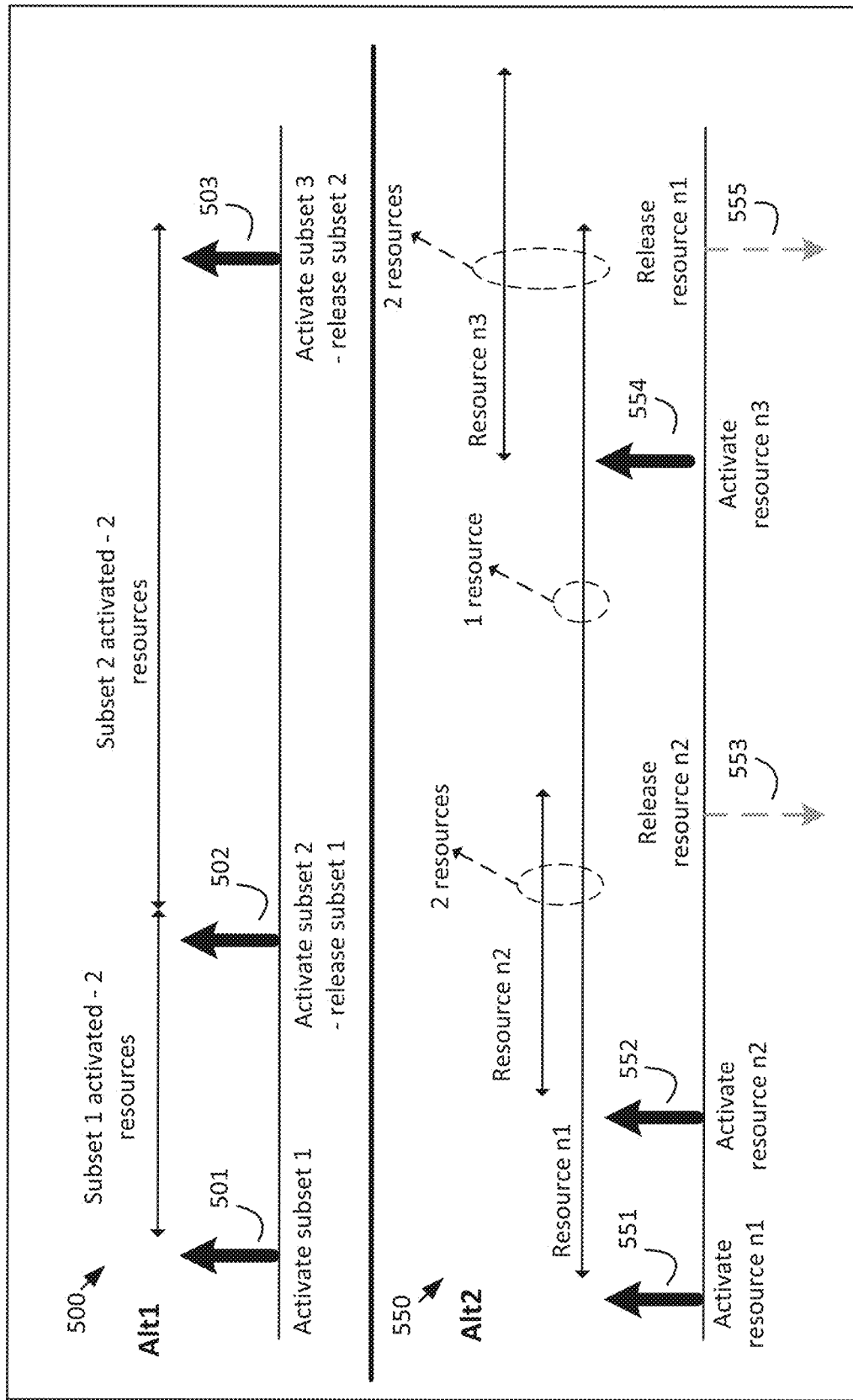
FIG. 5 illustrates an example of CSI-RS resource or resource set selection according to an embodiment of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in transmitter 400 of FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks.

A UE is configured with CSI-RS for CSI measurement and reporting. An allocation unit for CSI-RS can be termed CSI-RS resource which can correspond to non-zero-power (NZP) or zero-power (ZP). NZP CSI-RS is mainly used for channel measurement while ZP CSI-RS for interference measurement. For 5G NR, NZP CSI-RS resource is defined as a set of NZP CSI-RS port(s) mapped to a set of REs within a frequency span/a time duration which can be measured at least to derive a CSI. Multiple NZP CSI-RS resources can be configured to UE for supporting CoMP, beam management, and multiple beamformed CSI-RS based operations, where each NZP CSI-RS resource can have different number of CSI-RS ports.

As CSI-RS resources can become scarce when used for multiple applications and/or a large number of UEs. Therefore, there is a need for introducing an efficient CSI-RS resource sharing/pooling mechanism. However, this usually comes at the expense of dynamic signaling especially on DL control channels. To avoid large Downlink Control Information (DCI) payload and overloading (overuse) of PDCCH, RRC signaling and L2 MAC CE (MAC Control Element) can be used in conjunction with L1 DL control signaling. For 5G NR, however, RRC reconfiguration is to be avoided to minimize higher-latency latency. Therefore, there is another need for designing a signaling mechanism with minimum DL control signaling payload (such as DCI payload) which facilitates efficient resource sharing.

The present disclosure includes the following components for enabling CSI-RS allocation, transmission, and/or reception. A first component pertains to CSI-RS resource allocation involving multiple resource sets especially for aperiodic CSI-RS (AP-CSI-RS). A second component pertains to CSI-RS resource allocation in case of multiple component carriers (CCs). A third component pertains to aperiodic CSI (A-CSI) request via DL assignment. Each of these components can be used either by itself (without the other component) or in conjunction with at least one of the other component. Likewise, each of these components includes a plurality of sub-components. Each of the sub-components can be used either by itself (without any other sub-component) or in conjunction with at least one of the other sub-components.

The following embodiments and sub-embodiments are described for CSI-RS resources or resource sets. However, they can also be used for other types of RS resources or resource sets such as DMRS (demodulation RS), SRS (sounding reference signal), mobility RS, tracking RS, or beam management RS. In addition, descriptions solely pertaining resources or resource sets can be applied to ports or port sets wherein one resource comprises or includes a plurality of ports.

The following components and embodiments are applicable for transmission with CP-OFDM (cyclic prefix OFDM) waveform as well as DFT-SOFDM (DFT-spread OFDM) and SC-FDMA (single-carrier FDMA) waveforms. Furthermore, the following components and embodiments are applicable for transmission when the scheduling unit in time is either one subframe (which can consist of one or multiple slots) or one slot.

For the first component (that is, CSI-RS resource allocation for multiple resource sets), in the following embodiments and sub-embodiments, a UE can be configured with multiple Resource settings where each Resource setting can include S≥1 Reference Signal (such as CSI-RS) resource sets. Here, Resource is used for CSI or beam management related measurements and calculations. Using CSI-RS as a Resource or RS type, each resource set s (s=0, 1, . . . , S−1) can include $K_s \geq 1$ resources. In this case, LTE can be perceived as a special case where S=1. Therefore, with S=1, a UE can be configured with K≥1 CSI-RS resources. With S>1 CSI-RS resource sets, different resource sets can overlap with one another or not. Overlap between two sets (that is, at least one of the CSI-RS resources in a first set is the same as that in a second set) can occur when this feature is used for resource sharing across multiple UEs or TRPs.

For NR, configuring a UE with S>1 CSI-RS resource sets can be used for various purposes. An example use case is for CSI-RS resource aggregation whether for a UE to receive transmission from multiple TRPs (e.g., coherent joint transmission) or for forming a CSI-RS resource with larger number of ports. In such cases, aggregation across multiple CSI-RS resource sets can be performed either semi-statically or dynamically.

Another example use case is for beam management wherein a large number of beams (wherein a beam can be associated with a CSI-RS resource, a set of ports, or a combination of the two) can be grouped into S groups. Here, each beam group can correspond to a set. If a beam is associated with one CSI-RS resource (for example, of $N_k$ ports), beam management can be performed across S sets or beam groups. For instance, beam reporting and measurement can correspond to set or beam group quality (such as group-RSRP or group-CQI, along with its associated group or set index). Optionally, each set or beam group can be implemented as a coarse beam with its associated coarse beam index (or, alternatively, level-1 or coarse CSI-RS resource index). In this case, a correspondence between each set s (or beam group, which is composed of $K_s$ beams or CSI-RS resources) and a coarse beam or CSI-RS resource index can be defined or configured. In this case, there are two levels of beams or resources. Within each of the S sets, once a UE is assigned beam group of set s, a more refined beam management (for example, beam reporting or measurement across $K_s$ finer beams/resources) can be performed. Alternatively, instead of performing beam management within this set s, CSI acquisition can be performed across the $K_s$ CSI-RS resources, for instance, based on CSI-RS resource index (CRI), CQI, PMI, and/or RI.

When the total number of beams (or CSI-RS resources) K is large (for >6 GHz, K can be >100), signaling support for configuring a UE with S CSI-RS resource sets (or beam groups) as well as reporting/measurement within each resource set can be designed with at least two levels. This is to avoid excessive signaling overhead (DL and/or UL) while offering sufficient flexibility.

In another example use case, a UE is configured with S>1 CSI-RS resource sets wherein at least one of the S CSI-RS resource sets is used for CSI acquisition and at least another one of the S CSI-RS resource sets is used for beam management. With a special case of S=2, one CSI-RS resource set (with $K_0$>1 resources) can be configured with CSI reporting (such as with CRI, RI, PMI, and/or CQI) whereas another CSI-RS resource set (with $K_1$>1 resources) can be configured with beam management reporting (such as beam-RSRP and/or CRI).

In one embodiment (embodiment I.I), a UE is first configured with a total of K CSI-RS resources via higher-layer (e.g., RRC) signaling. The value of K can be large so that higher-layer/RRC reconfiguration can be minimized. Likewise, with large K, higher-layer configuration is used to avoid dynamic signaling of, for instance, at least 7-bit DCI field (per CC) for resource selection.

In addition to configuring the UE with K CSI-RS resources, the UE can also configured with S (≥1) CSI-RS resource sets or groups where K CSI-RS resources are grouped into S sets. The grouping of K CSI-RS resources into S resource sets/groups can be described as follows. Denote $\Sigma_i$ as the i-th CSI-RS resource set and $\rho_k$ the $k^{th}$ resource. Then, considering that at least two sets can have overlapping resources, such resource grouping can be described as follows:

$$\bigcup_{i=0}^{S-1} \Sigma_i = \{\rho_0, \rho_1, \ldots, \rho_{k-1}\}, \quad \text{(Equation 1)}$$

$$\sum_{i=0}^{S-1} |\Sigma_i| = \sum_{i=0}^{S-1} K_i \geq K$$

At least the following options can be utilized in one or more embodiments. First, the S sets are also configured via higher-layer/RRC signaling. Second, the S sets are configured dynamically (for instance, via L1/L2 DL control signaling). Third, the S sets are configured with a combination of higher-layer/RRC and L1/L2 DL control signaling. Overall, resource pooling or sharing gain is reduced with higher-layer (which implies higher-latency) signaling at the expense of dynamic signaling overhead. For dynamic signaling, L1 (via DCI used for DL/UL assignment) or L2 (MAC CE) signaling can be used.

When used with aperiodic CSI-RS (AP-CSI-RS), DCI-based CSI-RS resource selection can be used to indicate the UE a small subset of CSI-RS resources (including the possibility of only one CSI-RS resource) associated with the transmitted AP-CSI-RS (either in a same slot/subframe as the DCI or a later slot/subframe from the DCI). In the present disclosure, this stage is termed Dynamic 2. Prior to this stage of DCI-based CSI-RS resource selection, an intermediate dynamic signaling can also be used to select a larger subset from the K higher-layer configured CSI-RS resources. In the present disclosure, this stage is termed Dynamic 1. For Dynamic 1, either MAC CE or DCI-based signaling can be used. MAC CE incurs higher latency but is more reliable than DCI. Other than CSI-RS resource selection, Dynamic 1 and/or Dynamic 2 can also be used for CSI-RS resource set selection.

Dynamic 1 can either be used without any condition or can be used only when at least one condition is met in a UE configuration. In one scheme (condition 1), one condition is the value of K and/or N, or the value of S and/or M. In another scheme (condition 2), if S>1 is configured, one condition is the value of $N_s$ and/or $K_s$. In another scheme (condition 3), a combination of the previously mentioned two examples can be used. For example, a specific condition based on scheme (condition) 1 can be described as follows. If K>X (wherein the value of X is either configurable or fixed), Dynamic 1 is used. Otherwise (if K≤X), Dynamic 1 is skipped. Another specific condition based on scheme (condition) 1 can be described as follows. If S>Y (wherein the value of Y is either configurable or fixed), Dynamic 1 is used. Otherwise (if S≤Y), Dynamic 1 is skipped. If both K and S are configured via higher-layer signaling (Scheme B.1, C.1, C.2, or C.3 in TABLE 1 below), a condition based on both K and S can be used, e.g., if K>X (wherein the value of X is either configurable or fixed) or S>Y (wherein the value of Y is either configurable or fixed) then, Dynamic 1 is used. Otherwise (if K≤X and S≤Y), Dynamic 1 is skipped. The value of the threshold (X and/or Y) can be derived from the number of bits of the DCI field used for selection in Dynamic 2.

When used without any condition, Dynamic 1 is present for any value(s) of K and/or N, as well as S and/or M.

TABLE 1 lists several example schemes for embodiment I. Scheme A is based on CSI-RS resource selection while Scheme B.1 and B.2 are based on CSI-RS resource set selection. For scheme B.1, the higher-layer configuration can include a configuration for S CSI-RS resource sets along with the CSI-RS resource(s) for each of the S sets. It may or may not include an explicit configuration for the value of K. For this scheme (B.1), subset selection (Dynamic 1, if used) and resource selection (Dynamic 2) are performed on the level of resource set rather than resource. In Scheme C.1, C.2, and C.3, a subset of resources within at least one resource set is selected. For the purpose of CSI-RS resource selection, a CSI-RS resource corresponds to a CSI-RS resource index. Likewise, for the purpose of CSI-RS resource set selection, a CSI-RS resource set corresponds to a CSI-RS resource set index. For schemes C.1, C.2, or C.3, subset selection (Dynamic 1, if used) and resource selection (Dynamic 2) are performed on the level of resource.

TABLE 1

| Scheme | RRC (higher-layer) | Dynamic 1 (intermediate) | Dynamic 2: DCI-based |
|---|---|---|---|
| A | K ≥ 1 CSI-RS resources | Select N out of K CSI-RS resources | Select N' out of N CSI-RS resources |
| B. 1 | K ≥ 1 CSI-RS resources (total number of resources across S sets) and/or S ≥ 1 resource sets | Select M out of S resource sets | Select M' out of M resource sets |
| B. 2 | K ≥ 1 CSI-RS resources | S ≥ 1 resource sets | Select S' out of S resource sets |
| C. 1 | K ≥ 1 CSI-RS resources S ≥ 1 resource sets | Select $N_s$ out of $K_s$ CSI-RS resources for $s^{th}$ set, s = 0, 1, . . . , S − 1 | Select $N_s'$ out of $N_s$ CSI-RS resources for $s^{th}$ set, s = 0, 1, . . . , S − 1 |

TABLE 1-continued

| Scheme | RRC (higher-layer) | Dynamic 1 (intermediate) | Dynamic 2: DCI-based |
|---|---|---|---|
| C. 2 | K ≥ 1 CSI-RS resources S ≥ 1 resource sets | Select $N_s$ out of $K_s$ CSI-RS resources for $s^{th}$ set, s = 0, 1, . . . , S – 1 | Select S' out of S resource sets |
| C. 3 | K ≥ 1 CSI-RS resources S ≥ 1 resource sets | Select S' out of S resource sets | Select $N_s$ out of $K_s$ CSI-RS resources for each of the S' sets selected in Dynamic 1 |

For this embodiment, several exemplary signaling formats can be utilized in one or more embodiments for Dynamic 1 (resource or resource set selection/activation).

In a first option (Opt 1), a bitmap-based approach is used. For example, for Scheme A, a size-K bitmap, 1 at the $n^{th}$ component when the $n^{th}$ resource is activated/selected, 0 otherwise. One bitmap can be used per component carrier (CC). Here, the value of N can be implicitly signaled in bitmap (by the number of components with value of 1) or configured via higher-layer signaling. For Scheme B.1, a size-S bitmap, 1 at the $n^{th}$ component when the $n^{th}$ resource set is activated/selected, 0 otherwise. One bitmap can be used per component carrier (CC). Here, the value of M can be implicitly signaled in bitmap (by the number of components with value of 1) or configured via higher-layer signaling. For Scheme C.1, a size-$K_s$ bitmap for the $s^{th}$ set, 1 at the $n^{th}$ component when the $n^{th}$ resource is activated/selected and 0 otherwise, can be used, s=0, 1, . . . , S–1.

In a second option (Opt 2), a codeword-based approach wherein each code point of the codeword indicates a selection hypothesis is used. For example, for Scheme A, a $$\left\lceil \log_2 \binom{K}{N} \right\rceil$$

-bit field can be used with one field per component carrier (CC). The value of $N_s$ can be signaled as a part of Dynamic 1 or separately via RRC (higher-layer) signaling. For Scheme B.1, a $$\left\lceil \log_2 \binom{S}{M} \right\rceil$$

-bit field can be used with one field per component carrier (CC). The value of $N_s$ can be signaled as a part of Dynamic 1 or separately via RRC (higher-layer) signaling. For Scheme C.1, a $$\left\lceil \log_2 \binom{K_s}{N_s} \right\rceil$$

-bit field for the $s^{th}$ set, s=0, 1, . . . , S–1, can be used.

As previously mentioned, two sub-embodiments can be utilized in one or more embodiments: either MAC CE or DCI can be used for Dynamic 1.

In one sub-embodiment when MAC CE is used, one unit of signaling comprises one octet (a collection of 8 bits) wherein one octet can either carry a bitmap or a codeword. In case multiple octets are needed, they can be aggregated for one bitmap or codeword. An example procedure is as follows. First, a UE receives via PDSCH in slot n. Then UE, having successfully decoded the MAC CE message, assumes the selection/activation in slot n+D. The value of D can be the same as or different from that used for PDCCH. As an example, for scheme A, if a size-K bitmap is used, N can be implicitly signaled in the bitmap (hence dynamically configured). Then DCI payload for Dynamic 2 can change either dynamically (responding to MAC CE) or semi-statically (fixed to the maximum value of N). If a UE is configured with multiple component carriers or cells, one MAC CE signaling unit can be associated with one component carrier or one cell. Optionally, one MAC CE signaling unit can be used for the total number of CSI-RS resources (jointly) across all the component carriers or cells. Likewise, for scheme B.1, if a size-S bitmap is used, M can be implicitly signaled in the bitmap (hence dynamically configured). Then DCI payload for Dynamic 2 can change either dynamically (responding to MAC CE) or semi-statically (fixed to the maximum value of M). If a UE is configured with multiple component carriers or cells, one MAC CE signaling unit can be associated with one component carrier or one cell. Optionally, one MAC CE signaling unit can be used for the total number of CSI-RS resource sets (jointly) across all the component carriers or cells.

If Dynamic 1 is used without any condition, the MAC CE signaling is present. For example, when the bitmap approach is used, the size-K or size-S bitmap is present wherein each of the elements is one (i.e., all resources or resource sets are selected).

In another sub-embodiment when DCI is used, at least two examples scheme can be used. In the following embodiments, Scheme A (selection of N out of K configured resources) in TABLE 1 is assumed. Extensions for other schemes can be inferred from TABLE 1 and the description thereafter by those familiar with the arts.

In a first example (Alt1), CSI-RS resource or resource set selection (activation-deactivation) is done by activating N CSI-RS resources at a time. To activate N CSI-RS resources, one use of DCI is needed. As described above, the value of N can either be configured via higher-layer (RRC) or dynamic signaling. The N selected resources are deactivated when another DCI is received. This example can be illustrated in diagram 500 of FIG. 5 wherein N=2 is assumed for illustrative purposes. When a first DCI s received (501) 2 resources of out K are selected or activated. With the reception of a second DCI (502) where 2 possibly different resources are selected or activated, resource(s) different from those indicated in the latest DCI are released or deselected. Likewise, with the reception of a third DCI (503) where 2 possibly different resources are selected or activated, resource(s) different from those indicated in the latest DCI are released or deselected. This DCI can include a field which indicates selection of N out of K resources—either bitmap or codeword as described above—can be used.

In a second example (Alt2), CSI-RS resource or resource set selection (activation-deactivation) is done by activating 1 CSI-RS resource at a time. To activate a total of N CSI-RS resources, up to N consecutive uses of DCI are needed. At a given slot, therefore, the number of activated/selected CSI-RS resources can vary. Another DCI can be used to deselect or deactivate 1 CSI-RS resource. This example can be illustrated in diagram 550 of FIG. 5. When a first selection or activation DCI is received (551), 1 resource of out K is selected or activated, followed by a second selection or activation DCI (552) where another different resource is selected or activated. Up to the reception of 552, two CSI-RS resources are selected or activated. When a first deselection or deactivation DCI is received (553), 1 of the previously activated or selected resource is deactivated or selected. Up to the reception of 553, only 1 CSI-RS resource is selected or activated. When a third selection or activation DCI is received (554), another resource of out K is selected or activated. Up to the reception of 554, a total of 2 CSI-RS resources are selected or activated. When a second deselection or deactivation DCI is received (555), 1 Of the previously activated or selected resource is deactivated or selected. Up to the reception of 555, only 1 CSI-RS resource is selected or activated. A selection or activation DCI can be differentiated from a deselection or deactivation DCI by using a one-bit field (which indicates whether the DCI either selects or deselects a CSI-RS resource) in addition to a field which indicates 1 out of K configured CSI-RS resources. Alternatively, the one-bit field is not needed since when the UE receives the CSI-RS resource indication field and decodes value X for the first (or third, fifth, etc.) time, the UE can assume that the indicated CSI-RS resource is selected or activated. Likewise, when the UE receives the CSI-RS resource indication field and decodes value X for the second (or fourth, sixth, etc.) time, the UE can assume that the indicated CSI-RS resource is deselected or deactivated.

In a variation of the second example, CSI-RS resource or resource set selection (activation-deactivation) is done by activating x>1 CSI-RS resource at a time. To activate a total of N CSI-RS resources, up to [N/x] consecutive uses of DCI are needed.

Figure 6:
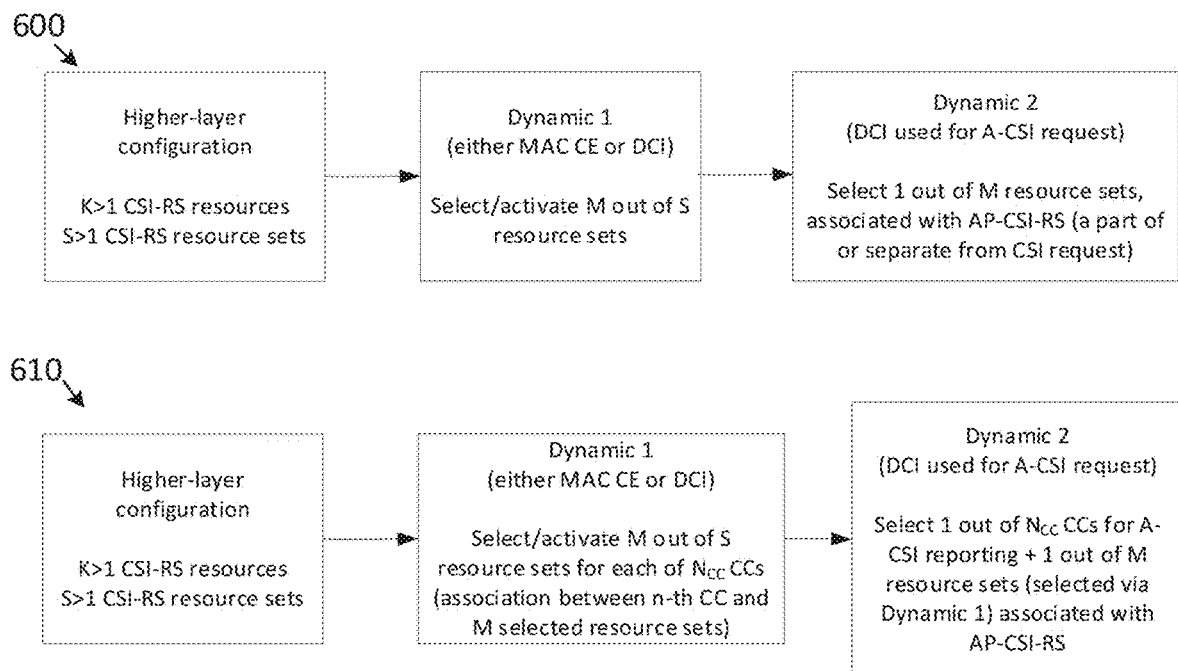
FIG. 6 illustrates two examples of two-stage CSI-RS resource or resource set selection for aperiodic CSI according to an embodiment of the present disclosure.

In any slot/subframe, the UE can receive a Dynamic 2 DCI which includes an A-CSI request and an indication of the selected CSI-RS resource out of the N' CSI-RS resources selected or activated via Dynamic 1 signaling (either the first example Alt1 or the second example Alt2). When the first example Alt1 is used, N'=N. When the second example Alt2 is used, N' is the cumulative number of activated CSI-RS resources as illustrated in FIG. 6. This indication can be signaled in the form of an n-bit DCI field where n allows a total of 2n states (or hypotheses or codepoints) for selecting CSI-RS resources and/or CSI-RS resource sets. For example, in Scheme B.1, the number of states $2'$ is equal to or larger than the number of possible selection combinations $$\binom{M}{M'}.$$

For M'=1, the number of states $2''$ is equal to or larger than M. Pertaining to the embodiments (sub-embodiments) where Dynamic 1 is used conditionally, the pertinent threshold values (X and/or Y) can be derived from or equal to the number of states of the DCI signaling $2''$. That is, if the total number of CSI-RS resources or resource sets is larger than the number of states of the DCI signaling 2n, Dynamic 1 is used. Otherwise, Dynamic 1 can be skipped (or, optionally, all the elements of the bitmap are set to one—if the bitmap approach is used).

The number of states of the DCI signaling ($2''$ or n itself) can be configured (for the UE) semi-statically via higher-layer (such as RRC) signaling.

Overall, compared to Alt1, Alt2 allows finer granularity (and efficiency) at the expense of total DL control overhead and latency (of activating N resources).

For this sub-embodiment (DCI-based solution), the DCI used for Dynamic 1 can be either DL-related or UL-related DCI (associated with DL assignment or UL grant, respectively). Alternatively, this DCI can be of a special format (rather than formats used for grant/assignment). To increase the reliability for this DCI, the UE can report an ACK/NAK in response to the reception of this DCI (which can be natural when, for instance, a DCI for DL assignment is used, but also can be used for special format DCI). In terms of its location in PDCCH (or in general DL L1 control channel) search space, it can be located either in common search space (which needs to be searched by connected UEs every slot/subframe) or UE-specific search space (which needs to be searched by a UE in relation to a form of UE identification).

To ensure efficient usage of DL L1 control channel (such as PDCCH), a UE-group DCI can be used for this purpose wherein multiple UEs can share a same CSI-RS resource or resource set selection. The UE-group DCI can be masked with a UE-group identification (such as UE-group RNTI) which is assigned to these UEs, for instance, when the UEs are RRC-connected. Whether the assigned RNTI is UE-specific or UE-group-specific can be transparent to the UE. Optionally, an extra indicator for the RNTI type can be used to differentiate this UE-group RNTI from other types of RNTI. Furthermore, the UE-group RNTI used for CSI-RS resource or resource set selection can further be differentiated from other types of UE-group RNTI. This is instrumental when the UE is expected to perform at least one different procedure when receiving and decoding the UE-group RNTI. In addition, if ACK/NACK is also used for Dynamic 1 DCI, upon detecting a DCI with an assigned UE-group RNTI, the UE is expected to report an ACK/NAK to the network/gNB/TRP. By reporting an ACK/NAK, the network/gNB/TRP can retransmit the DCI if most (if not all) the UEs fail to decode the DCI. Else, the network/gNB/TRP can assume that a UE which fails to decode the DCI (either via a NAK response or absence of response/DTX) assumes a previously (most recently) decoded DCI which includes CSI-RS resource or resource set indication.

For the second component (that is, CSI-RS resource allocation in case of multiple component carriers), the term component carrier (CC) is used to represent various concepts that pertain to the use of multiple radio resources or units, such as multiple component carriers (CCs) in carrier aggregation, multiple cells or multiple transmit-receive points (TRPs) and/or possibly multiple antenna array panels. In this second component, more detailed embodiments are provided for the case of multiple CCs or cells.

When a UE is configured to receive transmission from multiple component carriers (CCs) or multiple cells, such as in case of carrier aggregation (CA) and/or COMP, CSI-RS resource or resource set selection is performed for each of the CCs. When the UE is configured with aperiodic CSI (A-CSI) along with AP-CSI-RS, to avoid excessive DL signaling overhead (especially associated with Dynamic 2 described in Component 1 above), LTE uses an RRC-based scheme for supporting multiple CCs. With $N_{CC}$ component carriers, $\lceil \log_2 N_{CC} \rceil$-bit DCI field for CSI-RS resource selection (for LTE, S=1) is used along with an RRC-configured association between the $n^{th}$ hypothesis (for the $n^{th}$ CC) and the selected CSI-RS resource (1 out of N—activated via MAC CE). One drawback of this scheme is that in order to change the selected CSI-RS resource, RRC reconfiguration is needed. For NR, however, RRC reconfiguration is to be minimized. In addition, such RRC configuration (that is, association between a DCI hypothesis and the selected resource) beats the purpose of MAC CE based resource selection since RRC configuration incurs much more latency than MAC CE signaling.

The number of component carriers $N_{CC}$ for DL or UL can be configured either via higher-layer (RRC) signaling or MAC CE.

In one embodiment of the present disclosure, instead of RRC or higher-layer signaling, dynamic signaling is used to configure the association between a DCI field hypothesis (code point) in Dynamic 2 DCI and the selected CSI-RS resource or resource set for each of the $N_{CC}$ configured component carriers. This DCI field is used to request A-CSI reporting and, if applicable, to select one CSI-RS resource out of a small number of CSI-RS resources. In example schemes and sub-embodiments below, it is assumed that N CSI-RS resources are selected out of K higher-layer configured CSI-RS resources (Scheme A of Component 1 in TABLE 1) using Dynamic 1. Extensions to other schemes in TABLE 1 (such as Scheme B.1 where M out of S CSI-RS resource sets are selected) can be inferred by those familiar with the art. In addition, extensions to scenarios where the number of CSI-RS resources K or resource sets S can differ from one CC to another can also be inferred by those familiar with the art.

In one sub-embodiment (Scheme II.1.1), for a given UE, for each CC, which one of the K>1 higher-layer configured CSI-RS resources (or, for Scheme B.1 of TABLE 1, S>1 CSI-RS resource sets) is selected when an A-CSI report is requested (triggered) via UL-related DCI is configured for and indicated to the UE (by the network/gNB/TRP). For this indication, a $\lceil \log_2 K \rceil$-bit indicator per CC can be used for each UE. This association is configured for a UE as a part of (or analogous to) Dynamic 1 signaling.

This association scheme is used in conjunction with Dynamic 2 mechanism. In particular, it can be used together with a $\lceil \log_2 N_{CC} \rceil$-bit DCI field in the UL-related DCI for A-CSI request (in the same DL slot/subframe as AP-CSI-RS transmission) to indicate the presence of AP-CSI-RS for each CC.

In another sub-embodiment (Scheme II.1.2), for a given UE, for each CC, which N>1 of the K>1 higher-layer configured CSI-RS resources (or, for Scheme B.1 of TABLE 1, S>1 CSI-RS resource sets) is selected when an A-CSI report is requested (triggered) via UL-related DCI is configured for and indicated to the UE (by the network/gNB/TRP). For this indication, a $$\left\lceil \log_2 \binom{K}{N} \right\rceil$$

-bit indicator per CC can be used for each UE. This association is configured for a UE as a part of (or analogous to) Dynamic 1 signaling.

This association scheme is used in conjunction with Dynamic 2 mechanism. In particular, it can be used together with a $\lceil \log_2(NN_{CC}) \rceil$-bit DCI field in the UL-related DCI for A-CSI request (in the same DL slot/subframe as AP-CSI-RS transmission) to select 1 out of N CSI-RS resources for each CC.

As described above, any of the sub-embodiments described above configures an association between a hypothesis (code point) in a DCI field used to request A-CSI reporting and, if applicable, to select one CSI-RS resource out of a small number of CSI-RS resources—or, optionally, to select one CSI-RS resource set out of a small number of CSI-RS resource sets. In Scheme II.1.1, this association information includes $N_{CC} \lceil \log_2 K \rceil$-bit indicators wherein the n-th indicator (n=0, 1, . . . , $N_{CC}$-1) determines which 1 of the K higher-layer configured CSI-RS resources is selected for the n-th CC. When an A-CSI reporting is requested or triggered using the n-th code point of the $\lceil \log_2 N_{CC} \rceil$-bit DCI field of the Dynamic 2 DCI, the UE reports A-CSI for the n-th CC based on the CSI-RS resource selected for the n-th CC as the reference resource. In Scheme II.1.2, this association information includes $N_{CC}$ $$\left\lceil \log_2 \binom{K}{N} \right\rceil$$

-bit indicators wherein the n-th indicator (n=0, 1, . . . , $N_{CC}$-1) determines which N of the K higher-layer configured CSI-RS resources is selected for the n-th CC. When an A-CSI reporting is requested or triggered using the m-th code point of the $\lceil \log_2 NN_{CC} \rceil$-bit DCI field of the Dynamic 2 DCI (m=0, 1, . . . , $NN_{CC}$-1), the UE reports A-CSI for the $\lfloor m/N \rfloor$-th CC based on the CSI-RS resource selected for the (mod (n, $N_{CC}$))-th CC as the reference resource.

The two sub-embodiments (scheme II.1.1 and II.1.2) can be used together depending on the number of configured component carriers $N_{CC}$. Furthermore, the value of N can vary depending on $N_{CC}$ to ensure that the resulting DCI payload for Dynamic 2 is not excessive (or remains the same, i.e., $\lceil \log_2 NN_{CC} \rceil$ remains the same) while allowing some degree of flexibility in CSI-RS resource selection.

Therefore, in one variation of Scheme II.1.2, the value of N is specified (fixed) for a given value of $N_{CC}$. That is, $$N = \begin{cases} y_1, & 1 \le N_{CC} < x_1 \\ y_2, & x_1 \le N_{CC} < x_2 \\ \vdots & \vdots \\ y_P = 1 & N_{cc} \ge x_P \end{cases} \quad \text{(Equation 2)}$$

Here $x_1 < x_2 < \ldots < x_P$ and $y_1 > y_2 > \ldots > y_P = 1$. A special case is when P=2. In this case, when $N_{CC}$ is below a certain value $x_1$, $N=y_1>1$ is used. Otherwise, N=1 is used. In equation (2) or its special case of P=2 thereof, $\{x_1, \ldots, X_P\}$ and $\{y_1, \ldots, y_P\}$ can be chosen, for example, such that $\lceil \log_2 NN_{CC} \rceil$ does not exceed a given value. Optionally, $\{x_1, \ldots, x_P)\}$ and $\{y_1, \ldots, y_P\}$ can be chosen such that $\lceil \log_2 NN_{CC} \rceil$ remains the same for different values of $N_{CC}$. Optionally, $\{x_1, \ldots, X_P\}$ and $\{y_1, \ldots, y_P\}$ can be configured via higher-layer (RRC) signaling.

As mentioned the above Scheme II.1.1 and II.1.2 are described assuming Scheme A of TABLE 1. For Scheme B.1 of TABLE 1, K and N can be substituted with S and M, respectively.

This dynamic signaling can be done via DCI (hence DL L1 control channel) or MAC CE.

In one sub-embodiment (Scheme II.2.1), DCI-based scheme is used wherein a special DCI format used only for this purpose, without data DL/UL assignment. This DCI can be either UE-specific or UE-group-specific (where one DCI carries CSI-RS resource or resource set selection configuration for a group of UEs). If multi-function UE-group-specific DCI is used, this DCI can include a 'Function Indicator' field with one hypothesis (code point) indicating 'CSI-RS resource selection/configuration' (among other functions of this UE-group-specific DCI).

In another sub-embodiment (Scheme II.2.2), MAC-CE-based scheme is used wherein one or more octets are allocated to each CC per UE. In this case, one MAC CE is assigned for each of the $N_{CC}$ CCs. Optionally, one MAC CE can be used for all the $N_{CC}$ CCs. Since MAC CE is used for various purposes, a 'Function Indicator' field analogous to LTE LCID can be used to indicate the function of the MAC CE.

When a UE is configured with A-CSI reporting and AP-CSI-RS with multiple CSI-RS resources or resource sets, the UE procedure for A-CSI reporting can be described as follows. First, the UE receives a Dynamic 1 activation message (either via DCI or MAC CE) in slot/subframe n. Then, upon a successful decoding attempt, the UE assumes the CSI-RS resource or resource set configuration starting from slot/subframe $n+D_1$, until the UE receives either a deactivation message (associated with a previous activation) or another activation message in a later slot/subframe $n+D_2$. Between slot/subframe $n+D_1$ and $n+D_2$, whenever the UE receives an UL-related DCI including A-CSI request (corresponding to Dynamic 2 operation), the UE interprets the CSI request DCI field according to the CSI-RS resource or resource set configuration.

When the UE is configured with a CSI measurement setting with L>1 links (wherein each of the L links associates one CSI reporting setting with one Resource setting) and at least two of the L links correspond to CSI reporting settings configured with A-CSI reporting and Resource settings configured with AP-CSI-RS, the signaling for Dynamic 1 (either MAC CE or DCI) or for Dynamic 2 (DCI used for A-CSI request which can include CSI-RS resource or resource set selection) can include a "Link Indicator" which indicates which of the L links the signaling is associated with. For DCI-based signaling, this "Link Indicator" can be a part of or separate from the CSI request field. The size of the "Link Indicator" field depends on the value of L which is higher-layer configured. This indicator can also be signaled jointly with at least one of the CSI Request field and CSI-RS resource or resource set selection indicator.

FIG. 6 illustrates the use of Dynamic 1 and Dynamic 2 when the UE is configured with A-CSI reporting and AP-CSI-RS according to some embodiments and sub-embodiments in the present disclosure. Diagram 600 illustrates an example operation with $N_{CC}$=1 CC (with M'=1 for illustrative purposes) while diagram 610 illustrates an example operation with $N_{CC}$>1 CC. In both examples, Scheme B.1 of TABLE 1 is assumed.

When a UE is configured with multiple component carriers ($N_{CC}$>1) where each component carrier is associated with multiple CSI-RS resource sets (wherein the number of CSI-RS resource sets can be the same of different across different component carriers), the CSI reporting for each of the $N_{CC}$ component carriers is associated with at least one CSI Reporting setting. This reporting setting can be linked with one or multiple Resource settings wherein each Resource setting can include one or multiple CSI-RS resource sets. In this scenario, several sub-embodiments (i.e., variations of diagram 610) can be utilized in one or more embodiments.

In one sub-embodiment (Scheme II.3.1), the higher layer (e.g., RRC) configuration includes multiple CSI Reporting settings wherein each CSI Reporting setting can be associated with a component carrier and the CSI Reporting setting is linked with either one Resource setting or multiple Resource settings. The UE is further configured with a set of $N_{STATE}$ states wherein each state corresponds to a CSI Reporting setting. When one CSI Reporting setting is linked to multiple Resource settings, different states can correspond to a same CSI Reporting setting but different Resource settings. In this manner, CSI-RS resource or resource set selection can be performed via "state" selection by linking a Resource setting which includes a subset of CSI-RS resources or resource sets to a CSI Reporting setting. The subset of CSI-RS resources or resource sets can be derived from a subset or all of the CSI-RS resources or resource sets included in the Resource setting. Whether a subset or of all of the CSI-RS resources or resource sets are included in the corresponding "state" can be configured and indicated to the UE either semi-statically (via higher-layer or RRC signaling) or dynamically (via MAC CE or DCI). Since for this given "state", the one CSI Reporting setting can be linked to more than one Resource settings, the resource (or resource set) indication can be used for each of the Resource settings linked to the CSI Reporting setting. That is, if the CSI Reporting setting for this particular state j is linked to $M_j$ Resource settings, $M_j$ subset indications can be used. Each of the subset indications can be a bitmap with the size equal to the number of CSI-RS resources or resource sets included in the corresponding Resource setting. If only one CSI-RS resource or resource set is selected, a $\lceil \log_2(\text{NumResource}) \rceil$-bit indicator (NumResource is the number of resources or resource sets included in the Resource setting) can be used.

Therefore, for this sub-embodiment, a "state" j can correspond to (include references to) a CSI Reporting setting, one or more Resource settings linked to the CSI Reporting setting.

Optionally, a "state" j can correspond to (include references to) a CSI Reporting setting, one or more Resource settings linked to the CSI Reporting setting, and a CSI-RS resource (or CSI-RS resource set) subset selection indicator for each of the Resource setting(s). Optionally, the indication for Resource settings and CSI-RS resource (or CSI-RS resource set) subset selection for each of the Resource settings can be combined into one indicator. Optionally, an additional indicator which associates a CSI Reporting setting with a component carrier (CC) can be added.

The above "state" configuration can be performed semi-statically hence a part of higher-layer (e.g. RRC) signaling for aperiodic CSI reporting. Optionally, this "triggering state" configuration can also be signaled via MAC CE for faster update.

Furthermore, several different CSI Reporting settings can be associated with different component carriers. Therefore, triggering different CSI Reporting settings (via triggering different states) can result in triggering different component carriers.

Analogous to the previous embodiments, Dynamic 1 can be used as follows. If the number of states $N_{STATE}$ is larger than a threshold $X_{STATE}$, Dynamic 1 is used to down select the number of states from $N_{STATE}$ to $X_{STATE}$. For this purpose, either a $N_{STATE}$-bit bitmap (analogous to the above scheme II.1.1) or a $$\left\lceil \log_2 \binom{N_{STATE}}{X_{STATE}} \right\rceil$$

-bit indicator (analogous to the above scheme 1.2) can be used to signal the selected subset of the states, either via DCI (analogous to the above scheme II.2.1) or MAC CE (analogous to the above scheme II.2.2). If the number of states $N_{STATE}$ is less than or equal to the threshold $X_{STATE}$, Dynamic 1 is not used. The threshold $X_{STATE}$ can be fixed or higher-layer (e.g., RRC) configured. The threshold $X_{STATE}$ can correspond to the number of codepoints that can be accommodated by the DCI field used for A-CSI request in Dynamic 2 wherein one out of $X_{STATE}$ states is triggered. Note that one additional hypothesis for "No A-CSI request" may be needed—resulting in a total number of codepoints of ($X_{STATE}$+1). By triggering one of the states, a CSI Reporting setting which corresponds to a selection of CSI-RS resource or resource set (as well as component carrier, if the UE is configured with multiple component carriers) is selected or triggered.

Figure 7:
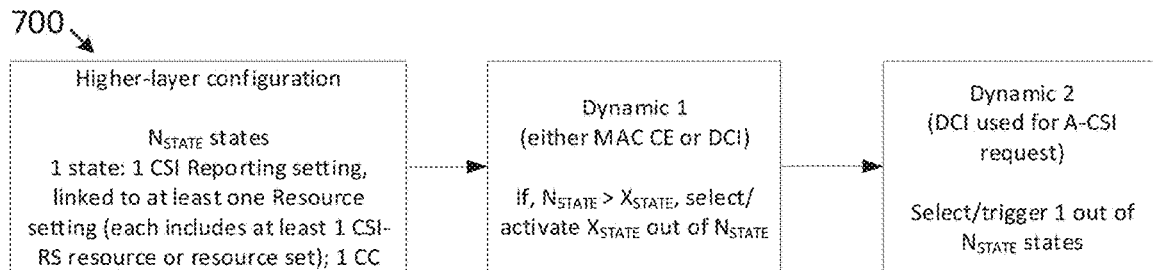
FIG. 7 illustrates an example of two-stage triggering for aperiodic CSI according to an embodiment of the present disclosure.

This sub-embodiment where triggering one of the states is associated with triggering one of the CSI Reporting setting can be illustrated in diagram 700 of FIG. 7.

In another sub-embodiment (Scheme II.3.2), the higher layer (e.g., RRC) configuration includes multiple CSI Reporting settings wherein each CSI Reporting setting can be associated with a component carrier and the CSI Reporting setting is linked with either one Resource setting or multiple Resource settings. The UE is further configured with a set of $N_{STATE}$ states wherein each state corresponds to at least one CSI Reporting setting. When one CSI Reporting setting is linked to multiple Resource settings, different states can correspond to a same CSI Reporting setting but different Resource settings. In this manner, CSI-RS resource or resource set selection can be performed via "state" selection by linking a Resource setting which includes a subset of CSI-RS resources or resource sets to a CSI Reporting setting. The subset of CSI-RS resources or resource sets can be derived from a subset or all of the CSI-RS resources or resource sets included in the Resource setting. Whether a subset or of all of the CSI-RS resources or resource sets are included in the corresponding "state" can be configured and indicated to the UE either semi-statically (via higher-layer or RRC signaling) or dynamically (via MAC CE or DCI). Since for this given "state", each of the CSI Reporting settings can be linked to more than one Resource settings, the resource (or resource set) indication can be used for each of the Resource settings linked to the CSI Reporting setting. That is, if a CSI Reporting setting for this particular state j is linked to $M_j$ Resource settings, $M_j$ subset indications can be used. Each of the subset indications can be a bitmap with the size equal to the number of CSI-RS resources or resource sets included in the corresponding Resource setting. If only one CSI-RS resource or resource set is selected, a $\lceil \log_2(\text{NumResource}) \rceil$-bit indicator (NumResource is the number of resources or resource sets included in the Resource setting) can be used.

Therefore, for this sub-embodiment, a "state" j can correspond to (include references to) one or more CSI Reporting settings, one or more Resource settings linked to each of the CSI Reporting setting(s).

Optionally, a "state"j can correspond to (include references to) one or more CSI Reporting settings, one or more Resource settings linked to each of the CSI Reporting setting(s), and a CSI-RS resource (or CSI-RS resource set) subset selection indicator for each of the Resource setting(s). Optionally, the indication for Resource settings and CSI-RS resource (or CSI-RS resource set) subset selection for each of the Resource settings can be combined into one indicator. Optionally, an additional indicator which associates a CSI Reporting setting with a component carrier (CC) can be added.

The above "state" configuration can be performed semi-statically hence a part of higher-layer (e.g. RRC) signaling for aperiodic CSI reporting. Optionally, this "triggering state" configuration can also be signaled via MAC CE for faster update.

Furthermore, several different CSI Reporting settings can be associated with different component carriers. Therefore, triggering different CSI Reporting settings (via triggering different states) can result in triggering different component carriers.

Analogous to the previous embodiments, Dynamic 1 can be used as follows. If the number of states $N_{STATE}$ is larger than a threshold $X_{STATE}$, Dynamic 1 is used to down select the number of states from $N_{STATE}$ to $X_{STATE}$. For this purpose, either a $N_{STATE}$-bit bitmap (analogous to the above scheme II.1.1) or a $$\left\lceil \log_2 \binom{N_{STATE}}{X_{STATE}} \right\rceil$$

-bit indicator (analogous to the above scheme II.1.2) can be used to signal the selected subset of the states, either via DCI (analogous to the above scheme II.2.1) or MAC CE (analogous to the above scheme II.2.2). If the number of states $N_{STATE}$ is less than or equal to the threshold $X_{STATE}$, Dynamic 1 is not used. The threshold $X_{STATE}$ can be fixed or higher-layer (e.g., RRC) configured. The threshold $X_{STATE}$ can correspond to the number of codepoints that can be accommodated by the DCI field used for A-CSI request in Dynamic 2 wherein one out of $X_{STATE}$ states is triggered. Note that one additional hypothesis for "No A-CSI request" may be needed—resulting in a total number of codepoints of ($X_{STATE}$+1). By triggering one of the states, at least one CSI Reporting setting which corresponds to a selection of CSI-RS resource or resource set (as well as component carrier, if the UE is configured with multiple component carriers) is selected or triggered.

Figure 8A:
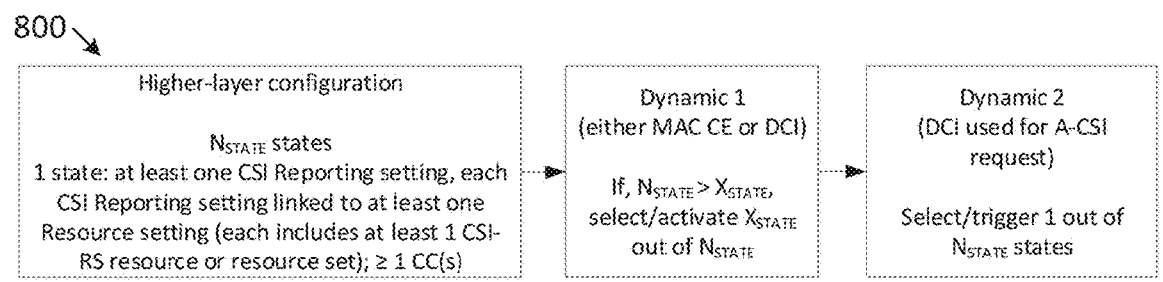
FIGS. 8A-8B illustrate examples of two-stage triggering for aperiodic CSI according to embodiments of the present disclosure.

This sub-embodiment where triggering one of the states is associated with triggering at least one of the CSI Reporting setting can be illustrated in diagram 800 of FIG. 8A. Note that the number of CSI Reporting settings for different states can vary.

In another sub-embodiment (Scheme II.3.3), the higher layer (e.g. RRC) configuration includes multiple CSI Reporting settings wherein each CSI Reporting setting can be associated with a component carrier and the CSI Reporting setting is linked with either one or multiple CSI-RS resources or resource sets. Each of the CSI-RS resources or resource sets can be referred to with a resource ID or resource set ID. This ID can be accompanied or include at least one other characteristic such as power-level (including zero power or non-zero power), time-domain characteristic (e.g. whether the resource is periodic, semi-persistent, or aperiodic—and if periodic or semi-persistent, slot offset and periodicity can be included as well), and/or frequency-domain characteristic. The UE is further configured with a set of $N_{STATE}$ states wherein each state corresponds to at least one CSI Reporting setting. In this manner, CSI-RS resource or resource set selection can be performed via "state" selection wherein a state is associated with a best of CSI-RS resources or resource sets. These CSI-RS resources or resource sets can be taken from a pool of CSI-RS resources or resource sets. This pool can be common to all UEs or UE-specific (therefore configured, for instance, via higher-layer signaling where one pool includes all the CSI-RS resources that the UE can use for different purposes). Therefore, the subset of CSI-RS resources or resource sets can be derived from a subset or all of the CSI-RS resources or resource sets in the pool. Whether a subset or of all of the CSI-RS resources or resource sets are included in the corresponding "state" can be configured and indicated to the UE either semi-statically (via higher-layer or RRC signaling) or dynamically (via MAC CE or DCI). Each of the CSI-RS resources or resource sets linked to the CSI Reporting setting can be used for channel or interference measurement. This can be indicated for each of the CSI-RS resources or resource sets. If used for interference measurement, the CSI-RS resource can be of zero or non-zero power.

Therefore, for this sub-embodiment, a "state" j can correspond to (include references to) one or more CSI Reporting settings, one or more CSI-RS resources or resource sets linked to each of the CSI Reporting setting(s).

The above "state" configuration can be performed semi-statically hence a part of higher-layer (e.g. RRC) signaling for aperiodic CSI reporting. Optionally, this "triggering state" configuration can also be signaled via MAC CE for faster update.

Furthermore, several different CSI Reporting settings can be associated with different component carriers. Therefore, triggering different CSI Reporting settings (via triggering different states) can result in triggering different component carriers.

Analogous to the previous embodiments, Dynamic 1 can be used as follows. If the number of states $N_{STATE}$ is larger than a threshold $X_{STATE}$, Dynamic 1 is used to down select the number of states from $N_{STATE}$ to $X_{STATE}$. For this purpose, either a $N_{STATE}$-bit bitmap (analogous to the above scheme 1.1) or a $$\left\lceil \log_2 \binom{N_{STATE}}{X_{STATE}} \right\rceil$$

-bit indicator (analogous to the above scheme 1.2) can be used to signal the selected subset of the states, either via DCI (analogous to the above scheme 2.1) or MAC CE (analogous to the above scheme 2.2). If the number of states $N_{STATE}$ is less than or equal to the threshold $X_{STATE}$, Dynamic 1 is not used. The threshold $X_{STATE}$ can be fixed or higher-layer (e.g. RRC) configured. The threshold $X_{STATE}$ can correspond to the number of codepoints that can be accommodated by the DCI field used for A-CSI request in Dynamic 2 wherein one out of $X_{STATE}$ states is triggered. Note that one additional hypothesis for "No A-CSI request" may be needed—resulting in a total number of codepoints of ($X_{STATE}$+1). By triggering one of the states, at least one CSI Reporting setting which corresponds to a selection of CSI-RS resource or resource set (as well as component carrier, if the UE is configured with multiple component carriers) is selected or triggered.

Figure 8B:
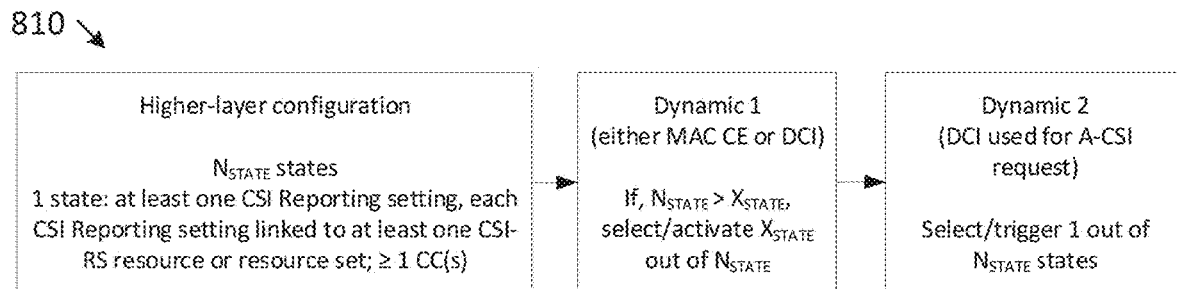

This sub-embodiment where triggering one of the states is associated with triggering at least one of the CSI Reporting setting can be illustrated in diagram 810 of FIG. 8B. Note that the number of CSI Reporting settings for different states can vary.

For all the above embodiments and sub-embodiments in the second component (especially schemes II.3.1, II.3.2, or II.3.3), an association between a CSI Reporting setting and a Resource setting (for the purpose of defining a state) can be explicitly indicated. Here, for a CSI Reporting setting, a linkage to a Resource setting can be indicated in relation to Resource setting index/indicator. The Resource setting indices/indicators associated with a CSI Reporting setting can be either included in the CSI Reporting setting or defined outside the CSI Reporting setting. Optionally it can be indicated with a link index/indicator. Here, a link index/indicator enumerates the links connecting CSI Reporting settings and Resource settings.

For the third component (that is, A-CSI request via DL assignment), in LTE, A-CSI request is performed via an UL grant with an UL-related DCI. When the UE is configured with AP-CSI-RS associated with the A-CSI reporting, the A-CSI is included in a same DL subframe as the one used for the UL-related DCI. Therefore, the CSI request field is expanded to include CSI-RS resource selection and included in the UL-related DCI. While this solution is natural (since the UL-related DCI includes an UL resource allocation field used for transmitting the requested A-CSI report, requesting A-CSI report only through UL-related DCI limits the flexibility of A-CSI reporting. In addition, the use of data-less UL grant only for triggering A-CSI report can be inefficient if other means are available at the network/gNB/TRP disposal.

In one embodiment of the present disclosure, A-CSI report can be requested via a DL-related DCI (hence DL assignment) which includes a CSI request field. This DL-related DCI can either be UE-specific or UE-group-specific. When the UE is configured with $N_{CC}$ CCs, this CSI request field can include $\lceil \log_2 N_{CC} \rceil$ bits wherein the n-th hypothesis or code point corresponds to a CSI request for the n-th CC (n=0, 1, . . . , $N_{CC}$-1).

In one sub-embodiment of this embodiment, an UL resource allocation (such as the UL RB(s) allocated for A-CSI reporting) is configured via higher-layer signaling. Therefore, there is no need for additional information beyond the CSI request field.

In another sub-embodiment, an additional $\lceil \log_2 P \rceil$-bit DCI field is used to indicate a selection of P higher-layer configured UL resource allocations. An example of the value of P is 4. In this case, a 2-bit DCI field for indicating the UL resource allocation (RA) used for A-CSI reporting can be included in the DL-related DCI used for CSI request. The UL resources can be obtained from PUSCH (UL shared channel), PUCCH (UL control channel), or both.

In a variation of this sub-embodiment, the CSI request field is expanded to include additional hypotheses for indicating the UL RA used for A-CSI reporting. For example, when the UE is configured with one CC, the one-bit CSI request field can be expanded to include a total of (P+1) hypotheses with one hypothesis (for instance, associated with the all-zero value) reserved for "no CSI request". As a result the number of bits for CSI request field is $\lceil \log_2(P+1) \rceil$. An example of the value of P is 3 which results in a 2-bit expanded CSI request field. An example is given in TABLE 2 below.

TABLE 2

| DCI field value | Hypothesis/interpretation |
| --- | --- |
| 00 | No CSI request |
| 01 | Report A-CSI with the 1$^{st}$ allocated UL resource |
| 10 | Report A-CSI with the 2$^{nd}$ allocated UL resource |
| 11 | Report A-CSI with the 3$^{rd}$ allocated UL resource |

In another sub-embodiment, at least one existing DCI field in the DL-related DCI can be used to indicate the UL RA used for A-CSI reporting when A-CSI reporting is requested. For example, when the UE is configured with one CC and the CSI request field is 1 (which means that A-CSI reporting is requested), at least one existing DCI field is reinterpreted as an UL RA indicator. An example is to use a combination of values from several DCI fields (such as MCS, HARQ-related fields, and DL Resource Allocation).

In one sub-embodiment, the DL-related DCI used for DL assignment can only be used for A-CSI report request when a DL assignment is performed via the DCI for the UE of interest. That is, when the DL-related DCI is received in slot/subframe n, a DL transmission on PDSCH for the UE of interest can be received in subframe n+D where D is either fixed or configured. In this case, there are at least two options. In a first option, the A-CSI can be reported together with HARQ-ACK associated with the scheduled/assigned DL transmission on PDSCH. In a second option, the A-CSI can be reported separately from HARQ-ACK associated with the scheduled/assigned DL transmission on PDSCH. For this second option, an additional DCI field indicating a second timing can be used—for example, to indicate the relative timing shift A (in slots) between A-CSI reporting and HARQ-ACK, or the absolute timing $D_{CSI}$ between the slot that includes the DL-related DCI and the slot used for A-CSI reporting.

Other DL-related DCIs can also be used.

Any of the above embodiments pertaining to aperiodic CSI-RS (A-CSI) can also be used for semi-persistent CSI-RS (SP-CSI-RS) or periodic CSI-RS (P-CSI-RS).

Any of the above variation embodiments can be utilized independently or in combination with at least one other variation embodiment.

Figure 9:
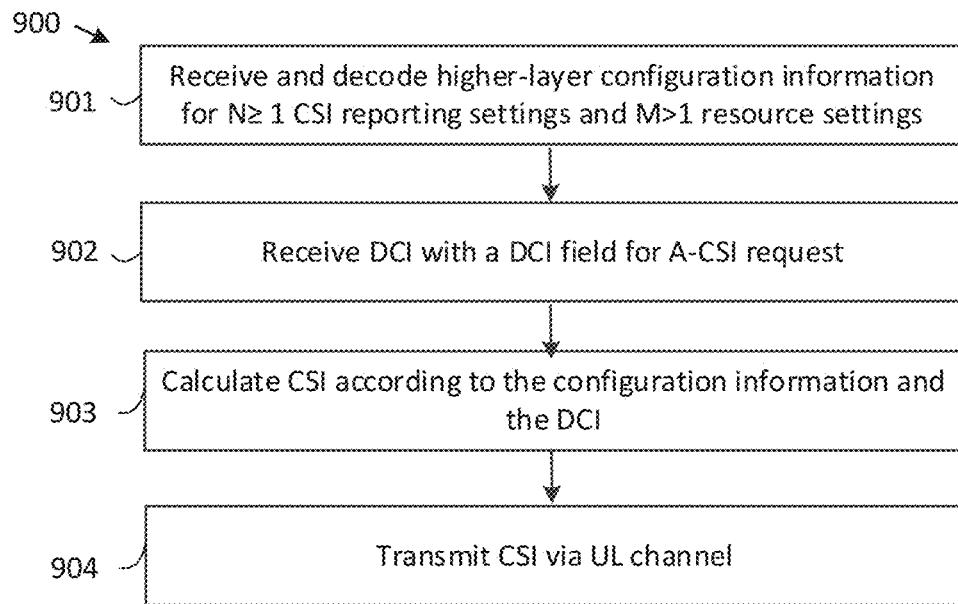
FIG. 9 illustrates a flowchart for an example method wherein a UE receives and decodes CSI reporting and resource configuration information according to an embodiment of the present disclosure.

FIG. 9 illustrates a flowchart for an example method 900 wherein a UE receives and decodes CSI reporting and resource configuration information according to an embodiment of the present disclosure. For example, the method 900 can be performed by the UE 116.

The method 900 begins with the UE receiving and decoding higher-layer configuration information for N channel state information (CSI) reporting settings and M Resource settings (step 901) wherein N is at least one and M is greater than one. At least one of the M Resource settings includes at least one CSI-RS resource set and the resource set includes at least one CSI-RS resource. The UE further receives downlink control information (DCI) which includes a DCI field for requesting aperiodic CSI reporting (step 902) wherein the DCI field includes a selection of one out of $X_{STATE}$ configured states. These $X_{STATE}$ states are a subset of $N_{STATE}$ higher-layer configured states and the subset is configured via media access control (MAC) control element if $N_{STATE}$ is greater than $X_{STATE}$; otherwise the $X_{STATE}$ states are higher-layer configured. In this case, at least one of $X_{STATE}$ and $N_{STATE}$ is higher-layer configured. At least one of the configured states corresponds to at least one CSI-RS resource set, at least one of the configured states corresponds to at least one downlink component carrier, and at least one of the configured states corresponds to at least one CSI reporting setting. The UE calculates a CSI according to the configuration information and the DCI (step 903) and transmits the calculated CSI on an uplink (UL) channel (step 904).

Figure 10:
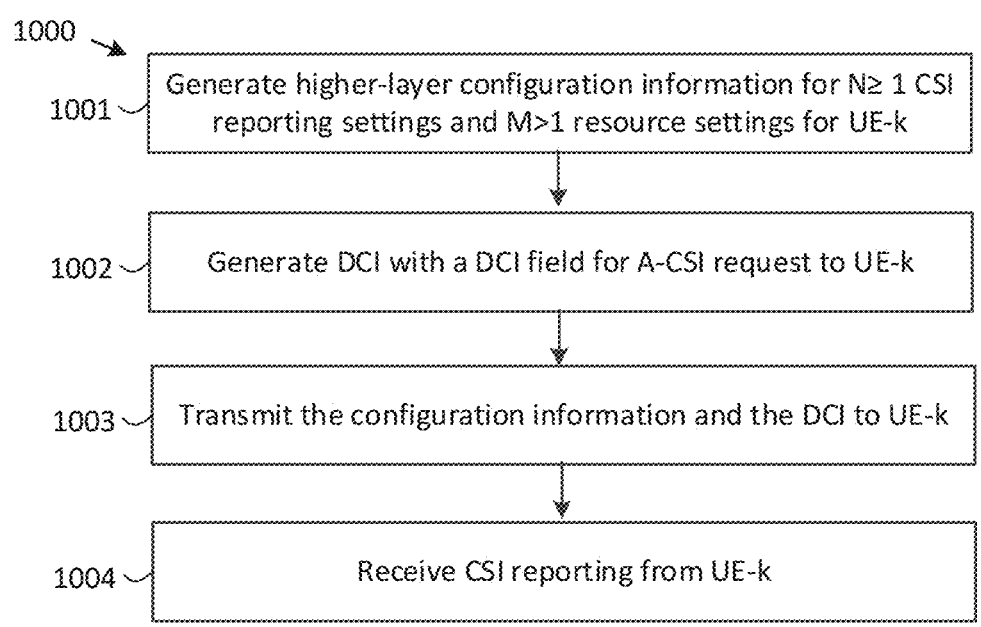
FIG. 10 illustrates a flowchart for an example method wherein a BS generates and transmits CSI reporting and resource configuration information for a UE (labeled as UE-k) according to an embodiment of the present disclosure.

FIG. 10 illustrates a flowchart for an example method 1000 wherein a BS generates and transmits CSI reporting and resource configuration information for a UE (labeled as UE-k) according to an embodiment of the present disclosure. For example, the method 1000 can be performed by the BS 102.

The method 1000 begins with the BS generating higher-layer configuration information for N channel state information (CSI) reporting settings and M Resource settings (step 1001), and a downlink control information (DCI) which includes a DCI field for requesting aperiodic CSI reporting for a UE (termed UE-k) (step 1002) wherein N is at least one and M is greater than one. At least one of the M Resource settings includes at least one CSI-RS resource set and the resource set includes at least one CSI-RS resource. The DCI field includes a selection of one out of $X_{STATE}$ configured states. These $X_{STATE}$ states are a subset of $N_{STATE}$ higher-layer configured states and the subset is configured via media access control (MAC) control element if $N_{STATE}$ is greater than $X_{STATE}$; otherwise the $X_{STATE}$ states are higher-layer configured. In this case, at least one of $X_{STATE}$ and $N_{STATE}$ is higher-layer configured. At least one of the configured states corresponds to at least one CSI-RS resource set, at least one of the configured states corresponds to at least one downlink component carrier, and at least one of the configured states corresponds to at least one CSI reporting setting. The BS transmits the configuration information via a downlink (DL) channel and the DCI via a DL control channel to UE-k (step 1003) and receives a CSI report calculated in accordance with the configuration information and the DCI on an uplink (UL) channel from UE-k (step 1004).

Although FIGS. 9 and 10 illustrate examples of methods for receiving configuration information and configuring a UE, respectively, various changes could be made to FIGS. 9 and 10. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE), comprising:
a transceiver configured to:
  receive higher-layer configuration information for N channel state information (CSI) reporting settings and M resource settings, and
  receive downlink control information (DCI) that includes a DCI field for requesting aperiodic CSI reporting; and
a processor operably connected to the transceiver, the processor configured to:
  decode the higher-layer configuration information and the DCI, and
  calculate a CSI according to the higher-layer configuration information and the DCI,
wherein the transceiver is further configured to transmit the calculated CSI on an uplink (UL) channel,
wherein N is at least one, M is at least one, and the DCI field indicates a selection of one out of $X_{STATE}$ configured states, and
wherein:
  the $X_{STATE}$ configured states are a subset of $N_{STATE}$ higher-layer configured states,
  the subset is configured via a media access control (MAC) control element if $N_{STATE}$ is greater than $X_{STATE}$, and
  the $X_{STATE}$ configured states are higher-layer configured if $N_{STATE}$ is not greater than $X_{STATE}$.

2. The UE of claim 1, wherein the state is associated with at least one of report settings and resource setting pair.

3. The UE of claim 1, wherein:
at least one of the M Resource settings includes at least one CSI-reference signal (RS) resource set, and
the at least one CSI-RS resource set includes at least one CSI-RS resource.

4. The UE of claim 3, wherein at least one of the $X_{STATE}$ configured states corresponds to the at least one CSI-RS resource set.

5. The UE of claim 1, wherein at least one of the $X_{STATE}$ configured states corresponds to at least one downlink component carrier.

6. The UE of claim 1, wherein at least one of $X_{STATE}$ and $N_{STATE}$ is higher-layer configured.

7. The UE of claim 1, wherein at least one of the $X_{STATE}$ configured states corresponds to at least one CSI reporting setting.

8. A base station (BS), comprising:
 a processor configured to generate (i) higher-layer configuration information for N channel state information (CSI) reporting settings and M Resource settings and (ii) downlink control information (DCI) that includes a DCI field for requesting aperiodic CSI reporting; and
 a transceiver operably connected to the processor, the transceiver configured to:
 transmit the higher-layer configuration information and the DCI to a user equipment (UE) via one or more downlink (DL) control channels, and
 receive, from the UE, a CSI report calculated in accordance with the higher-layer configuration information and the DCI on an uplink (UL) channel,
 wherein N is at least one, M is at least one, and the DCI field includes a selection of one out of $X_{STATE}$ configured states, and
 wherein:
  the $X_{STATE}$ configured states are a subset of $N_{STATE}$ higher-layer configured states,
  the subset is configured via a media access control (MAC) control element if $N_{STATE}$ is greater than $X_{STATE}$, and
  the $X_{STATE}$ configured states are higher-layer configured if $N_{STATE}$ is not greater than $X_{STATE}$.

9. The BS of claim 8, where in the state is associated with at least one of report settings and resource setting pair.

10. The BS of claim 8, wherein:
 at least one of the M Resource settings includes at least one CSI-reference signal (RS) resource set, and
 the at least one CSI-RS resource set includes at least one CSI-RS resource.

11. The BS of claim 10, wherein at least one of the $X_{STATE}$ configured states corresponds to the at least one CSI-RS resource set.

12. The BS of claim 8, wherein at least one of the $X_{STATE}$ configured states corresponds to at least one DL component carrier.

13. The BS of claim 8, wherein at least one of the $X_{STATE}$ configured states corresponds to at least one CSI reporting setting.

14. A method for operating a user equipment (UE), the method comprising:
 receiving and decoding higher-layer configuration information for N channel state information (CSI) reporting settings and M Resource settings;
 receiving downlink control information (DCI) that includes a DCI field for requesting aperiodic CSI reporting;
 calculating a CSI according to the higher-layer configuration information and the DCI; and
 transmitting the calculated CSI on an uplink (UL) channel,
 wherein N is at least one, M is at least one, and the DCI field includes a selection of one out of $X_{STATE}$ configured states, and
 wherein:
  the $X_{STATE}$ configured states are a subset of $N_{STATE}$ higher-layer configured states,
  the subset is configured via a media access control (MAC) control element if $N_{STATE}$ is greater than $X_{STATE}$, and
  the $X_{STATE}$ configured states are higher-layer configured if $N_{STATE}$ is not greater than $X_{STATE}$.

15. The method of claim 14, wherein the state is associated with at least one of report settings and resource setting pair.

16. The method of claim 14, wherein:
 at least one of the M Resource settings includes at least one CSI-reference signal (RS) resource set, and
 the at least one CSI-RS resource set includes at least one CSI-RS resource.

17. The method of claim 16, wherein at least one of the $X_{STATE}$ configured states corresponds to the at least one CSI-RS resource set.

18. The method of claim 14, wherein at least one of the $X_{STATE}$ configured states corresponds to at least one downlink component carrier.

19. The method of claim 18, wherein at least one of $X_{STATE}$ and $N_{STATE}$ is higher-layer configured.

20. The method of claim 14, wherein at least one of the $X_{STATE}$ configured states corresponds to at least one CSI reporting setting.

* * * * *